(12) United States Patent
Noguchi

(10) Patent No.: US 9,485,834 B2
(45) Date of Patent: Nov. 1, 2016

(54) LED ILLUMINATION DEVICE FOR FLUORESCENT LIGHT FIXTURE

(76) Inventor: Hirokazu Noguchi, Tokyo (JP)

( * ) Notice: Subject to any disclaimer, the term of this patent is extended or adjusted under 35 U.S.C. 154(b) by 507 days.

(21) Appl. No.: 14/000,469

(22) PCT Filed: Feb. 22, 2012

(86) PCT No.: PCT/JP2012/054332
§ 371 (c)(1),
(2), (4) Date: Aug. 20, 2013

(87) PCT Pub. No.: WO2012/115173
PCT Pub. Date: Aug. 30, 2012

(65) Prior Publication Data
US 2013/0328402 A1 Dec. 12, 2013

(30) Foreign Application Priority Data

Feb. 22, 2011 (JP) ................................ 2011-035381
Jun. 23, 2011 (JP) ................................ 2011-139955

(51) Int. Cl.

| H05B 37/02 | (2006.01) |
|---|---|
| F21S 9/02 | (2006.01) |
| H02J 9/02 | (2006.01) |
| H02J 9/06 | (2006.01) |
| H05B 33/08 | (2006.01) |
| F21Y 101/00 | (2016.01) |

(52) U.S. Cl.
CPC ................ H05B 37/02 (2013.01); F21K 9/27 (2016.08); F21S 9/022 (2013.01); H02J 9/02 (2013.01); H02J 9/06 (2013.01); H05B 33/0854 (2013.01); H05B 37/0227 (2013.01); F21Y 2101/00 (2013.01); F21Y 2103/10 (2016.08); F21Y2115/10 (2016.08); H02J 9/061 (2013.01); Y02B 20/386 (2013.01); Y10T 307/625 (2015.04)

(58) Field of Classification Search
CPC ...... H05B 37/02; H05B 37/0227; F21K 9/27
USPC ........................................................ 307/66
See application file for complete search history.

(56) References Cited

U.S. PATENT DOCUMENTS

| 2006/0103352 | A1* | 5/2006 | Jones | H02J 7/0022 |
|---|---|---|---|---|
| | | | | 320/128 |
| 2009/0322287 | A1* | 12/2009 | Ozeki | H02J 7/0068 |
| | | | | 320/145 |
| 2010/0109438 | A1* | 5/2010 | Scoggins, Jr. | H02J 9/02 |
| | | | | 307/66 |

FOREIGN PATENT DOCUMENTS

| JP | 09-289082 | 11/1997 |
|---|---|---|
| JP | 10-270177 | 10/1998 |

(Continued)

*Primary Examiner* — Rexford Barnie
*Assistant Examiner* — Daniel Kessie
(74) *Attorney, Agent, or Firm* — Tutunjian & Bitetto, P.C.

(57) ABSTRACT

An LED illumination device that can be mounted between a pair of sockets provided to a fluorescent light fixture is provided with a first power source circuit that illuminates an LED using DC power obtained by converting and rectifying AC power supplied from the sockets, and a second power source circuit that illuminates the LED using an internal battery. An IC chip installed in the illumination device detects a first current conduction state in two AC power lines that supply the AC power necessary to drive the first power supply circuit and a second current conduction state in another AC power line, and, on the basis thereof, determines whether the device is in a normal illumination mode, a normal off mode, or an emergency illumination mode. On the basis of the determination results, the LED illumination device is controlled according to the mode. When in the emergency illumination mode, the LED is illuminated by the second power source circuit, and the LED illumination device functions as an emergency light.

4 Claims, 15 Drawing Sheets

(56) References Cited

FOREIGN PATENT DOCUMENTS

| | | |
|---|---|---|
| JP | 2001-118688 | 4/2001 |
| JP | 2004-192833 | 7/2004 |
| JP | 2004-303614 | 10/2004 |
| JP | 2009-105020 | 5/2009 |
| JP | 2009105020 A * | 5/2009 |
| JP | 2009-151946 | 7/2009 |
| JP | 49714966 B | 7/2009 |
| TW | 201113464 A | 4/2011 |
| TW | M246529 U | 10/2014 |

* cited by examiner

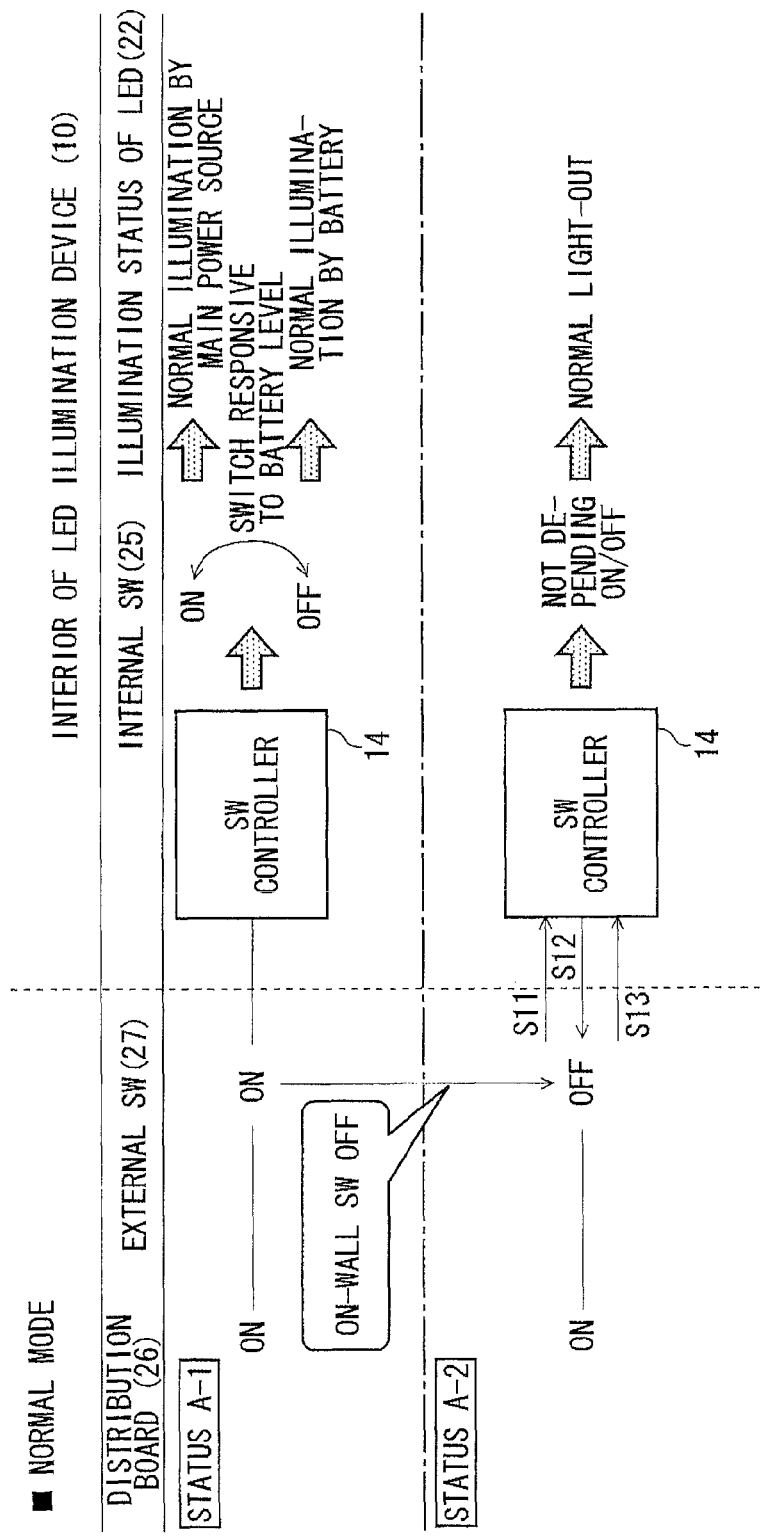

LED ILLUMINATION DEVICE FOR FLUORESCENT LIGHT FIXTURE

FIELD OF INVENTION

The present invention relates to an illumination device using a LED (light emitting diode) light source, which is usable in substitution of an existing fluorescent lamp.

BACKGROUND ART

Fluorescent lamps have been frequently used as indoor and outdoor illumination devices. However, they are not lightened in an emergency such as a power supply shutdown. Accordingly, the Building Standards Act of Japan requires that there should be installed emergency lights in commercial facilities and accommodations for the purpose of evacuation guidance.

However, the conventional emergency lights have been installed individually from the normal illumination devices, which should in practice limit the number and place of the emergency lights to be installed. This means that, in an emergency, only a small number of the emergency lights are lightened in darkness at limited places. Let us imagine that a power supply is accidentally interrupted due to an earthquake or fire in an underground railway or an underground shopping area, for example. The nearby people would tend to be moved to a better-lighted place, which will be strengthened by mass psychology. Therefore, all of the nearby people would rush toward the place of installment of the emergency lights, which could result in an expected accident.

In recent years, LED illumination devices usable in substitution of the existing fluorescent lamps have been proposed (for example, the following Patent Documents 1 and 2). This has well-improved properties such as energy-saving due to its lowered power consumption, ecology due to a decrease of $CO_2$, and safety because of no contents of toxic substance such as mercury and, therefore, it is expected that the LED illumination devices will come into wider use in future. Nevertheless, it has been less contemplated that the LED illumination devices should be used in an emergency such as a power supply shutdown Patent Document 1: Japanese Patent (Un-examined) Publication No. 2004-192833

Patent Document 2: Japanese Patent (Un-examined) Publication No. 2004-303614

SUMMARY OF INVENTION

Problems to be Solved by Invention

Accordingly, a problem to be solved by the present invention is to provide an illumination device using an LED light source, which is usable in substitution of the existing fluorescent lamp, to which is added a function that it is automatically lightened in an emergency such as a power supply shutdown, so that, even when a power supply is interrupted due to an earthquake or a fire in an underground railway or an underground shopping area, for example, everybody in said area can take refuge in safety and at ease, thereby preventing an unexpected accident. Another problem to be solved by the present invention is to provide a method capable of accurately controlling the switching of a fluorescent type LED illumination device, in dependence upon the status of an AC power supply.

Means for Solving the Problems

To solve these problems, according to claim 1 of the present invention, there is provided an LED illumination device fittable between a pair of sockets already provided for a fluorescent lamp, which comprises a first power supply circuit that illuminates LED's by using a DC power obtained by converting and rectifying an AC power supplied from the sockets, a second power supply circuit that illuminates the LED's by using an internal buttery, and a switch controller that controls switching of illumination modes during normal illumination operation to be done while a light switch is being ON. The illumination mode is switched between a first illumination mode and a second illumination mode. In the first illumination mode, the first power supply circuit will lighten the LED's and charge the battery. In the second illumination mode, the second power supply will lighten the LED's. The switch controller further operates to control such that, in an emergency wherein the AC power supply is interrupted, the second power supply circuit will lighten the LED's.

According to claim 2 of the present invention, in the LED illumination device of claim 1, the switch controller controls such that, when a residual amount of the battery reaches a predetermined upper threshold, the first illumination mode is switched to the second illumination mode, and when the residual amount of the battery reaches a predetermined lower threshold, the second illumination mode is switched to the first illumination mode.

According to claim 3 of the present invention, in the LED illumination device of claim 2, the switch controller judges that the battery residual amount reaches to the upper or lower threshold, in response to a signal from a charge controller that constantly monitors the battery residual amount.

According to claim 4 of the present invention, in the LED illumination device of claim 3, the charge controller executes a gradual light-decreasing control such that, when the battery residual amount is increased to a level approximate to the upper threshold during operation in the first illumination mode, an intensity of illumination driven by the normal power source is gradually decreased, and when it reaches the upper threshold so that the illumination mode is switched to the second illumination mode, an intensity of illumination becomes substantially equal to an intensity of illumination to be given by the battery. It also executes a gradual light-increasing control such that, when the battery residual amount is decreased to a level approximate to the predetermined lower threshold during operation in the second illumination mode, an intensity of illumination driven by the battery is gradually increased, and when it reaches the lower threshold so that the first illumination mode is switched to the second illumination mode to be driven by the normal power source, an intensity of illumination becomes substantially equal to an intensity of illumination to be driven by the normal power source.

According to claim 5 of the present invention, in the LED illumination device of claim 4, the charge controller executes the gradual light-decreasing control or the gradual light-increasing control by increasing or decreasing a voltage or current value of the battery within a predetermined time period.

According to claim 6 of the present invention, there is provided an LED illumination device fittable between a pair of sockets already provided for a fluorescent lamp, which comprises a first power supply circuit for lightening LED's with a DC power obtained by converting and rectifying an AC power supplied from the sockets, a second power supply circuit for lightening the LED's by an internal battery, and a discriminator for discriminating which mode is applicable, among a normal illumination mode wherein the LED's are driven by the first or second power supply circuit when a light switch is ON, a normal light-out mode wherein there is no LED illumination because the light switch is OFF, and an emergency illumination mode wherein the LED's are driven by the second power supply circuit so that the LED illumination device functions as an emergency light in case of an AC power supply shutdown.

According to claim 7 of the present invention, in the LED illumination device of claim 6, the normal illumination mode comprises a first normal illumination mode wherein the first power supply circuit illuminates the LED's and charges the battery, and a second normal illumination mode wherein the second power supply circuit illuminates the LED's. The discriminator discriminates one of the first normal illumination mode, the second normal illumination mode, the normal light-out mode and the emergency illumination mode.

According to claim 8 of the present invention, in the LED illumination device of claim 6, the discriminator detects, when the device is fitted between the sockets, one of a first current-flow status wherein an electricity is supplied to the illumination device via two AC power lines that have been provided to supply the AC power necessary to drive the first power supply circuit, and a second current-flow status wherein an electricity is given to the illumination device via another AC power line that should now be provided individually from the said two AC power lines. Based on detection of the first and second current-flow status, the discriminator discriminates one of the LED illumination ON/OFF modes.

According to claim 9 of the present invention, in the LED illumination device of claim 8, the discriminator discriminates that the first normal illumination mode is applicable when the first and second current-flow status are both alive, that the normal light-out mode is applicable when the first current-flow status is not alive but the second current-flow status is alive, and that the emergency illumination mode is applicable when the first and second current-flow status are both not alive.

Advantages of Invention

In accordance with the present invention defined in claim 1, when a power supply via the first power supply circuit is interrupted without normal light-out operation by the light switch, which should be in an emergency such as power supply shutdown, the LED illumination device is controlled in such a manner that the battery is driven to lighten the LED's, so that all of the LED illumination devices installed in an area of the power supply shutdown can be lightened, which could not have been achieved in the prior art solution wherein only a limited number of the emergency lights could be lightened in the power supply shutdown area. Therefore, even when a power supply is interrupted due to an earthquake or a fire in an underground railway or an underground shopping area, for example, everybody in said area can take refuge in safety and at ease. In addition, even when the illumination devices are suddenly turned off due to a power supply shutdown in an opening shop or an office during business hours, the drive mode will soon be switched to the battery drive mode so that all of the LED illumination devices will be lightened in a moment, thereby posing no problem for their normal business.

In accordance with the present invention defined in claim 2, when the LED's are lightened via the first power supply circuit in the normal illumination mode, a surplus power is supplied to the battery so as to charge the same, whereas when the battery reaches the predetermined upper threshold, the drive mode is switched to the battery drive mode wherein the LED's are lightened by the battery. Accordingly, there is no power consumption as far as the illumination device operates in the second illumination mode. For example, when a control cycle is determined such that the first illumination mode runs in one hour for the lightening and the battery charge and the second illumination mode runs in three hours for the lightening with the battery, even in 24-hours continuous lightening, a power is consumed only in total six hours of the first illumination mode operation. The LED illumination device itself is less power-consumptive (the LED's works at the order of 22 W, which is less than a half of 51 W, for example, of the existing fluorescent lamps). For these reasons, the power consumption is about $\frac{1}{10}$ or less, providing a great power-saving effect.

In accordance with the present invention defined in claim 3, there is provided a charge controller that constantly monitors the residual amount of the battery. Therefore, the switch controller operates in response to a signal from the charge controller to discriminate quickly and accurately that the residual amount of the battery reaches the upper threshold or the lower threshold, thereby smoothly controlling the mode switch between the first illumination mode and the second illumination mode.

In accordance with the present invention defined in claim 4, the gradual light-decreasing control is executed in order to prevent a sudden decrease of the illumination intensity which could otherwise result from the mode switch from the first illumination mode with the normal power source to the second illumination mode with the battery power source, whereas the gradual light-increasing control is executed in order to prevent a sudden increase of the illumination intensity which could otherwise result from the mode switch from the second illumination mode to the first illumination mode. By this, the people therearound should be free from being given a strange feeling that something happens.

In accordance with the present invention defined in claim 5, it is possible to easily execute the gradual light-decreasing control or the gradual light-increasing control by the charge controller that controls to decrease or increase the voltage or current of the battery.

In accordance with the present invention defined in claim 6, the discriminator automatically discriminates one of the normal illumination mode, the normal light-out mode and the emergency illumination mode, in which the LED illumination device should operate, which makes it possible to precisely control the turning on-and-off of the LED's depending upon the current conditions. For instance, when a power supply via the first power supply circuit is interrupted without the normal light-out operation by the light switch in an emergency such as power supply shutdown, the discriminator will automatically discriminate that the emergency illumination mode should be applicable and controls such that the battery mounted in the LED illumination device is driven to lighten the LED's. Consequently, all of the plural LED illumination devices installed in an area of the power supply shutdown can be turned on simultaneously, which could not have been achieved in the prior art solution wherein only a small number of the emergency lights in the power supply shutdown area could be lightened. Therefore, even when a power supply is interrupted due to an earthquake or a fire in an underground railway or an underground shopping area, for example, everybody in said area can take refuge in safety and at ease. In addition, even when the illumination devices are suddenly turned off due to a power supply shutdown in an opening shop or an office during business hours, the drive mode will be switched to the battery drive mode so that all of the LED illumination devices will be lightened in a moment, thereby posing no problem for their normal business.

In accordance with the present invention defined in claim 7, the discriminator discriminates an applicable one of the normal illumination modes, between the first normal illumination mode wherein the first power supply circuit will lighten the LED's and charge the battery, and the second normal illumination mode wherein the second power supply circuit will lighten the LED's. Accordingly, the LED's are lightened and the battery is charged both via the first power supply circuit in the first normal illumination mode, and there is no power consumption for lightening the device during operation in the second illumination mode, thereby providing a great power-saving effect.

In accordance with the present invention defined in claims 8 and 9, it is possible to discriminate the applicable LED lighting or light-out mode in response to detection of the current-flow status in the three AC power lines, through which an AC power can be supplied to the LED illumination device. In the normal light-out mode, the battery is charged by using the current to be supplied through the AC power lines that are alive in the second current-flow status. When this is effected in the night time zone to which reduced electricity rates are applicable, a greater power-saving effect may be obtained.

BRIEF DESCRIPTION OF DRAWINGS

FIG. 5 A chart of the control to be carried out in the normal illumination mode and the normal light-out mode in an embodiment wherein a slight current is applied to the illumination device in case of a power supply shutdown so that it may be used as a simple emergency light.

MOST PREFERRED EMBODIMENTS OF INVENTION

Figure 1:
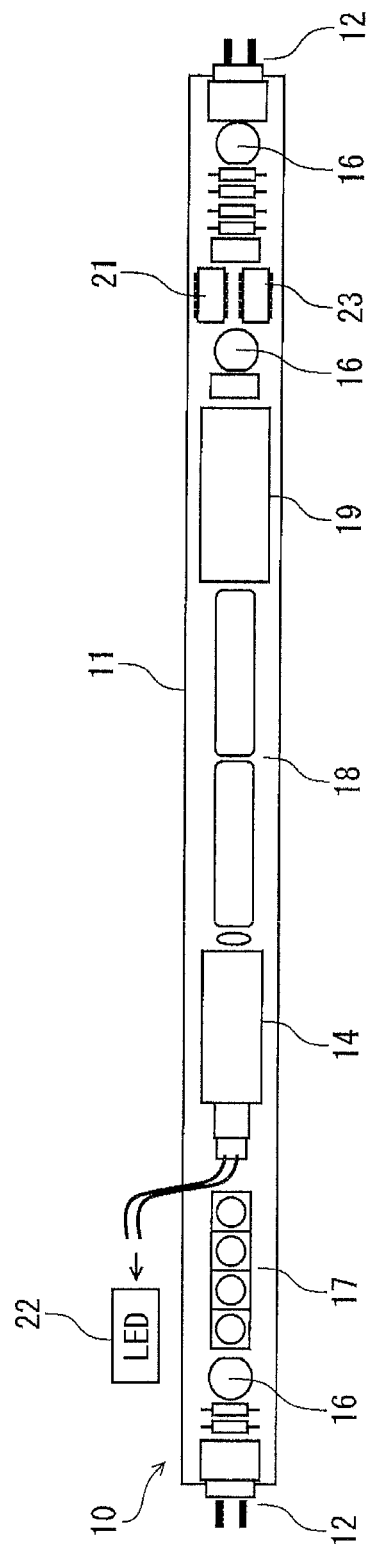
FIG. 1 A schematic view showing the construction of a fluorescent lamp type LED illumination device according to the present invention.

Several embodiments of the present invention will be described in detail in reference to FIG. 1 and FIG. 2. An LED illumination device 10 is usable in substitution of the existing fluorescent lamp, which has the same size and shape as those of the existing fluorescent lamp and may be fitted between a pair of sockets already installed for the existing fluorescent lamp. The LED illumination device 10 has a cover 11 of substantially a cylindrical cross-section, in which an LED mount base (not shown) for mounting LED's thereon is securely contained. The light emitting from the LED's is transmitted through or diffused by the cover 11 for illumination. In one embodiment, the cover 11 is divided into two substantially half-around parts, one comprising a cover member made of plastic material having light transparency, light semi-transparency or light diffusion property, such as polycarbonate, and the other comprising a heat sink made of heat radiation property, such as aluminum. The LED mount base or substrate is contained in the cover member, and power supply circuits including a battery, which will be described hereinlater, are contained in the heat sink.

As already known in Patent Documents 1 and 2, the LED illumination device 10 has a power supply circuit (a first power supply circuit 13) that illuminates the LED's 22 on the substrate by supplying a DC power to an LED drive circuit 15, said DC power being obtained by transforming and rectifying an AC power supplied from sockets (not shown) already installed for the existing fluorescent lamp, when it is fitted through bases 12 between the sockets. The first power supply circuit 13 includes an AC-DC converter 24 (see FIG. 2, not shown in FIG. 1) for converting the AC power to the DC power, a rectifier 16 for rectifying the DC power outputted from the AC-DC converter 24, a voltage transformer 17 for transforming the DC power to be of a predetermined voltage, an electrolytic capacitor 18 (see FIG. 1, none of them being shown in FIG. 2) serving as a buffer for temporary storage of electricity to stabilize the power supply, etc. As described later, in normal operation, when an external switch 27 mounted on a wall, for example, in the existing fluorescent lamp lighting system, is turned ON, the DC power is supplied via the first power supply circuit 13 to the LED drive circuit 15 to lighten the LED's 22 so that the LED illumination device 10 is turned on, and, in the meantime, it is turned off when the switch 27 becomes OFF to interrupt the power supply.

The LED illumination device 10 further comprises a second power supply circuit 20 for illuminating the LED's 22 by the battery 19. In order that the battery 19 is capable of lightening the LED's for a maximum period of time, it is preferable that the battery 19 is sufficiently small to be contained in the light cover 11, while having a battery capacity as much as possible. At present, use of a lithium ion battery is most suitable. A switch controller 14 will control such that an IC switch 25 arranged in the first power supply circuit 13 is opened and closed under the predetermined conditions, thereby controlling the switching of the power supply circuits 13, 20 to be used for lightening the LED's 22. A charge controller 21 will constantly monitor the residual amount of the battery by detecting the voltage and current values in the battery 19. When the residual amount of the battery reaches the upper or lower threshold, it will send a signal notifying this to the switch controller 14. In another embodiment, the upper and lower thresholds of the residual amount of the battery are stored in the internal IC switch 25 as one of the product specifications or values determinable by the user, and it will discriminate that the residual amount has reached the upper/lower threshold in response to a residual amount detecting signal from the charge controller 21. Because a voltage of the lithium ion battery must be precisely controlled at the time of charge and discharge, the charge controller 21 will control such that it remains 4.2V when it is charged and 3.0V when discharged. The switch controller 14 and the charge controller 21 (which constitutes "controller" in the present invention) will make various control, which will be described below in detail.

Figure 3:
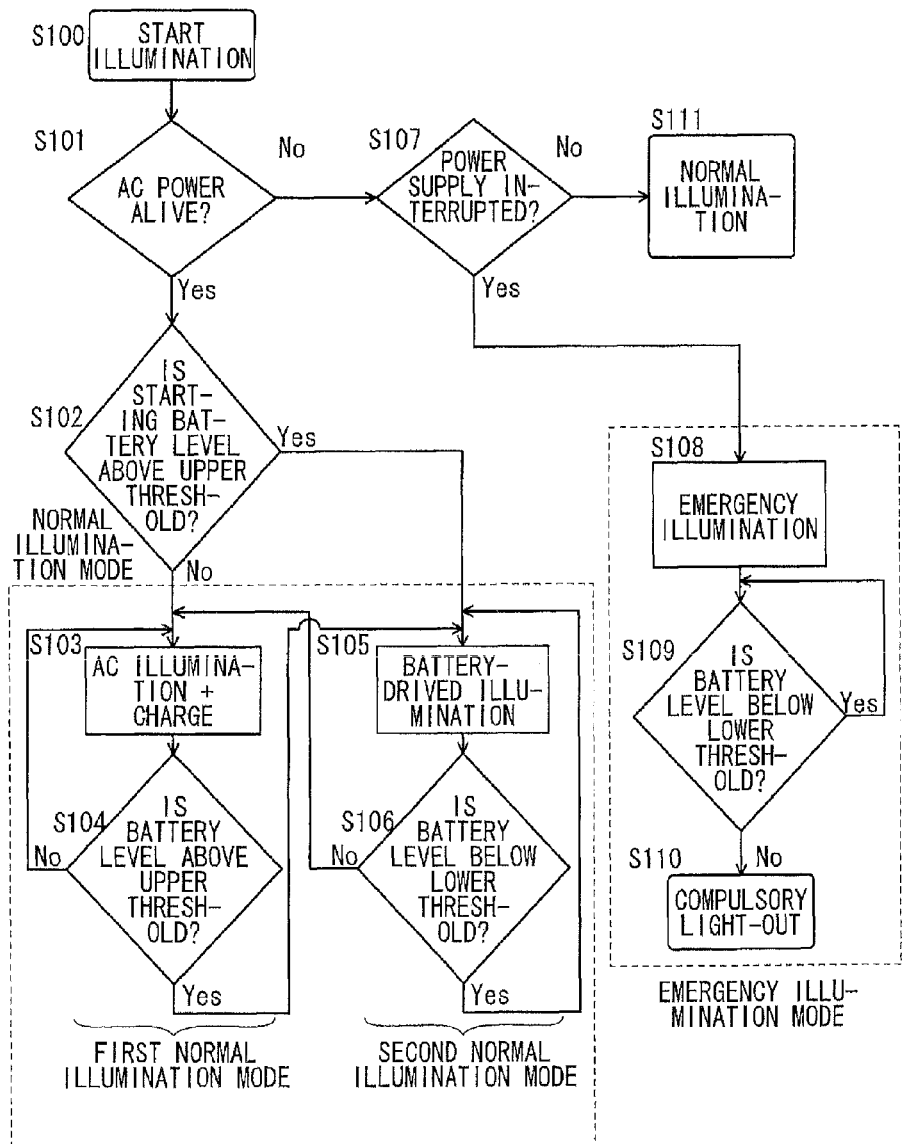
FIG. 3 A flowchart showing the outline of the control to be carried out during operation of this LED illumination device in the normal illumination mode.

The schematic control flow will be first described in reference to the flowchart shown in FIG. 3. Provided that the normal operation (an external switch 27 to be described later:ON) has been done for lightening a group of LED illumination devices 10, that may be all of the illumination devices in a facility concerned or a part of those in an optionally partitioned area (S100). At S101, it is confirmed whether or not a necessary AC power is alive in a facility such as an office and a shop where a plurality of LED illumination devices 10 are installed. This may be achieved by, for example, connecting an ammeter and/or a voltmeter to an AC power line through which AC power is supplied to all of the plural LED illumination devices in the facility or a part of those in the optionally partitioned area, so that a current value and/or a voltage value flowing through the AC power line should be monitored at all times.

When the electricity flow is confirmed (S101:Yes), at S102, it is confirmed whether or not the residual amount of the battery is enough to lighten the LED's only by the battery 19. More particularly, an upper threshold representing a residual amount of the battery that should be necessary to start the LED's to be lightened by the battery 19 is predetermined, and when the residual amount is below the upper threshold (S102:No), the illumination device is controlled to be operated in the first normal illumination mode wherein the LED drive circuit 15 is driven by DC power that is obtained by transforming and rectifying AC power supplied to the respective LED illumination devices 10, and the battery is charged also by the said DC power (S103). By way of example, in this mode, the total luminous flux of the LED illumination device 10 is 2500 Lm and the power consumption is the order of 22-25 W. During operation in the first normal illumination mode, a residual amount of the battery is monitored at S104, and the operation in this first normal illumination mode will go on until the residual amount is restored to above the upper threshold (S104:Yes).

On the other hand, when the residual amount of the battery exceeds the threshold (S102:Yes), the illumination device is controlled to be operated in the second normal illumination mode wherein the LED drive circuit 15 is driven only by the battery 19 to lighten the LED's 22 (S105). In the second normal illumination mode, by way of example, the total luminous flux of the LED illumination device 10 is 1900 Lm and the power consumption is zero because no AC power is used in this mode. During operation in the second normal illumination mode, a residual amount of the battery is monitored at S106, and the operation in this second normal illumination mode will go on as far as the residual amount of the battery keeps above the predetermined lower threshold (S106:Yes).

When the residual amount becomes again above the upper threshold (S104:Yes) as a consequence that the battery 19 has been charged during operation in the first normal illumination mode, the first normal illumination mode is switched to the second normal illumination mode. When the battery is discharged during operation in the second normal illumination mode so that the residual amount becomes below the lower threshold (S106:No), the second normal illumination mode is switched to the first normal illumination mode.

When the electricity flow is not confirmed (S101:No), at S107, it is discriminated if this is caused by the normal light-out operation or by power supply shutdown in an emergency. A technical method for this discrimination will be described later in detail. When it is discriminated that there is no emergency power supply shutdown (S107:No), which should mean that the normal operation (by the external switch 17 to be described later:OFF) for turning off a group of the LED illumination devices 10 has been done, all of the LED illumination devices 10 in a facility concerned or a part of those in an optionally partitioned area are turned off in the normal light-out mode (S111). Also in this case, as far as there is no power supply shutdown, AC power is supplied to the LED illumination device 10 to charge the battery 19 (as will be described later).

When the emergency power supply shutdown is found (S107:Yes), the LED illumination device 10 is controlled in the emergency illumination mode, at S108. The LED illumination device 10 should be used as an emergency light in this case, so that it is practically sufficient to be lightened at the total luminous flux of 400-500 Lm or around. The power consumption is zero, because the LED drive circuit 15 is driven only by the battery 19 to lighten the LED's 22. The battery 19 will be gradually discharged while the LED illumination device 10 is lightened in the emergency illumination mode, so that it is discriminated at S109 whether or not there is a residual amount sufficient to keep the LED's lightened only by the battery 19 as the emergency light. More particularly, a lower threshold representing a residual amount of the battery that is necessary to keep the LED's to be lightened as the emergency light is predetermined, and as far as the residual amount remains above the lower threshold (S109:Yes), the illumination device is kept lightened as the emergency light. On the contrary, when it reaches below the lower threshold (S109:No), the illumination device 10 is controlled to be compulsorily turned off (S110). This will prevent the battery 19 from being entirely discharged.

The battery level check at S102, S104, S106 and S109 (and also at S112 and S113 in FIG. 12 and at S112, S113 and S115 in FIG. 13, which will be described later) may be carried out by monitoring a voltage value and/or a current value of the battery 19 at all times or at constant intervals, which may be practiced with a single sensor. In one embodiment, the discrimination at S102 and S104 is carried out in response to a signal that is produced by the sensor when detecting that the residual amount is above or below an upper threshold (a voltage of 90%, for example, of the full-charged one), the discrimination at S106 is carried out in response to another signal that is produced by the sensor when detecting that the residual amount is above or below a lower threshold (a voltage of 20%, for example, of the full-charged one), and the discrimination at S109 is carried out in response to still another signal that is produced by the sensor when detecting that the residual amount is above or below another lower threshold (a voltage of 10%, for example, of the full-charged one). The lower threshold used in the discrimination at S106 and S109 may be same, but it is preferable that, as indicated in the above examples, the lower threshold used in S109 is determined to be somewhat lower than the other, which will be effective in keeping the function of the emergency light for a longer period of time, while preventing the complete discharge of the battery.

Figure 4A:
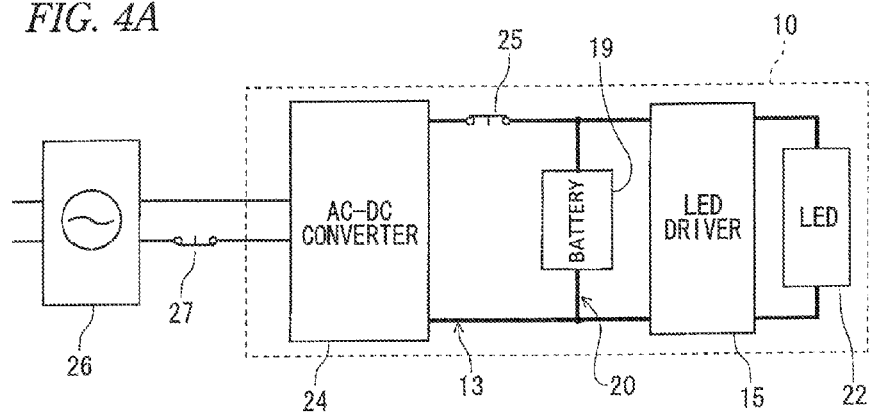
FIG. 4 An explanatory view of the control to be carried out during operation of this LED illumination device in the normal illumination mode.
Figure 4B:
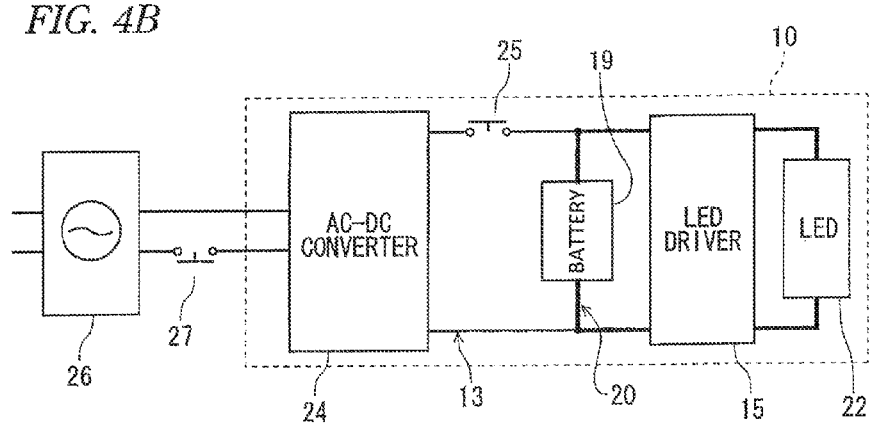

The control to be carried out when the external switch 27, mounted on a wall, for example, in the facility for turning on and off the illumination devices 10 remains ON, which comprises S103-S106 in the flowchart of FIG. 3 for control in the normal illumination mode, will be described in reference to FIG. 4 as well as FIG. 3. In this case, the switch controller 14 will operate, in response to the charge of the battery 19 (which is discriminated at S102 of FIG. 3), to make the switching control, by opening/closing the internal IC switch 25, between the first normal illumination mode wherein the LED drive circuit 15 is driven by DC power that is obtained by transforming and rectifying AC power supplied from the distribution board 26 in the facility to the respective LED illumination devices 10, and the battery 19 is charged also by the said DC power (FIG. 3:S103, FIG. 4(*a*)) and the second normal illumination mode wherein the LED drive circuit 15 is driven only by the battery 19 to lighten the LED's 22, with no consumption of AC power, when the battery 19 remains still sufficiently charged (FIG. 3:S105, FIG. 4(*b*)).

More specifically, when the external switch 27 is ON while the electricity is normally supplied from the distribution board 26 in the facility (S101:Yes), the battery 19 is gradually charged while the LED's 22 are lightened in the first normal illumination mode. When receiving from the charge controller 21 a detection signal notifying that the residual amount of the battery reaches the predetermined upper threshold (S104:Yes), the switch controller 14 controls such that the internal IC switch 25 is turned OFF to switch the illumination mode from the first normal illumination mode to the second normal illumination mode. The battery 19 will be gradually exhausted while the LED's 22 are in illumination in the second normal illumination mode. When receiving from the charge controller 21 another detection signal notifying that the residual amount reaches the predetermined lower threshold (S106:No), the switch controller 14 controls such that the internal IC switch 25 is turned ON to switch the illumination mode from the second normal illumination mode to the first normal illumination mode. In another embodiment, time intervals are determined in advance for keeping the LED's lightened in the first normal illumination mode and in the second normal illumination mode, respectively (for example, the LED's 22 are lightened in the first normal illumination mode for one hour and then in the second normal illumination mode for three house, and this cycle is repeated), and the illumination mode is switched between the first normal illumination mode and the second normal illumination mode to meet the predetermined time intervals. In this embodiment, it is preferable to make the switching control in response to the residual amount together with the above-described control. For example, when the residual amount reaches the predetermined lower threshold during operation in the second normal illumination mode, even if within the time interval, it is switched to the first normal illumination mode to prevent an over-discharge of the battery 19.

When the external switch 27 becomes OFF during operation in the normal illumination mode, a power supply to the illumination device 10 is interrupted at once, which is detected by the switch controller 14 (S101:No) to stop the LED drive circuit 15, thereby turning the LED's 22 off. As having been described, as far as AC power is normally supplied from the main power source, the LED's 22 are switched on and off in response to ON/OFF of the external switch 27 to execute the normal illumination/light-out operation.

In accordance with the fluorescent lamp type LED illumination device 10 according to the present invention, when AC power supply from the main power source is interrupted in case of power shutdown, for example, even if the LED's 22 are lightened by the first power supply circuit 13 in the normal illumination mode (the first normal illumination mode), this is compulsorily switched to the second power supply circuit 20 so that the LED's are lightened by the battery 19 so as to become usable as an emergency light. The Building Standards Act of Japan requires that the emergency lights should be installed in commercial facility, industrial facility and accommodations, which are illumination devices for lightening areas in room interiors or corridors for the purpose of evacuation guidance in case of power supply shutdown. Under these legal obligations, an emergency light should be kept lightened at a constant luminous intensity (more than one lux, for example, when measured on a floor) for a period of several dozens of minutes to several hours, regardless of ON/OFF of the external switch 27. For this purpose, there is a third power line to be used for the emergency lights, in addition to two AC power lines to be used for the normal illumination (one of which is used also for the emergency lights).

Figure 6:
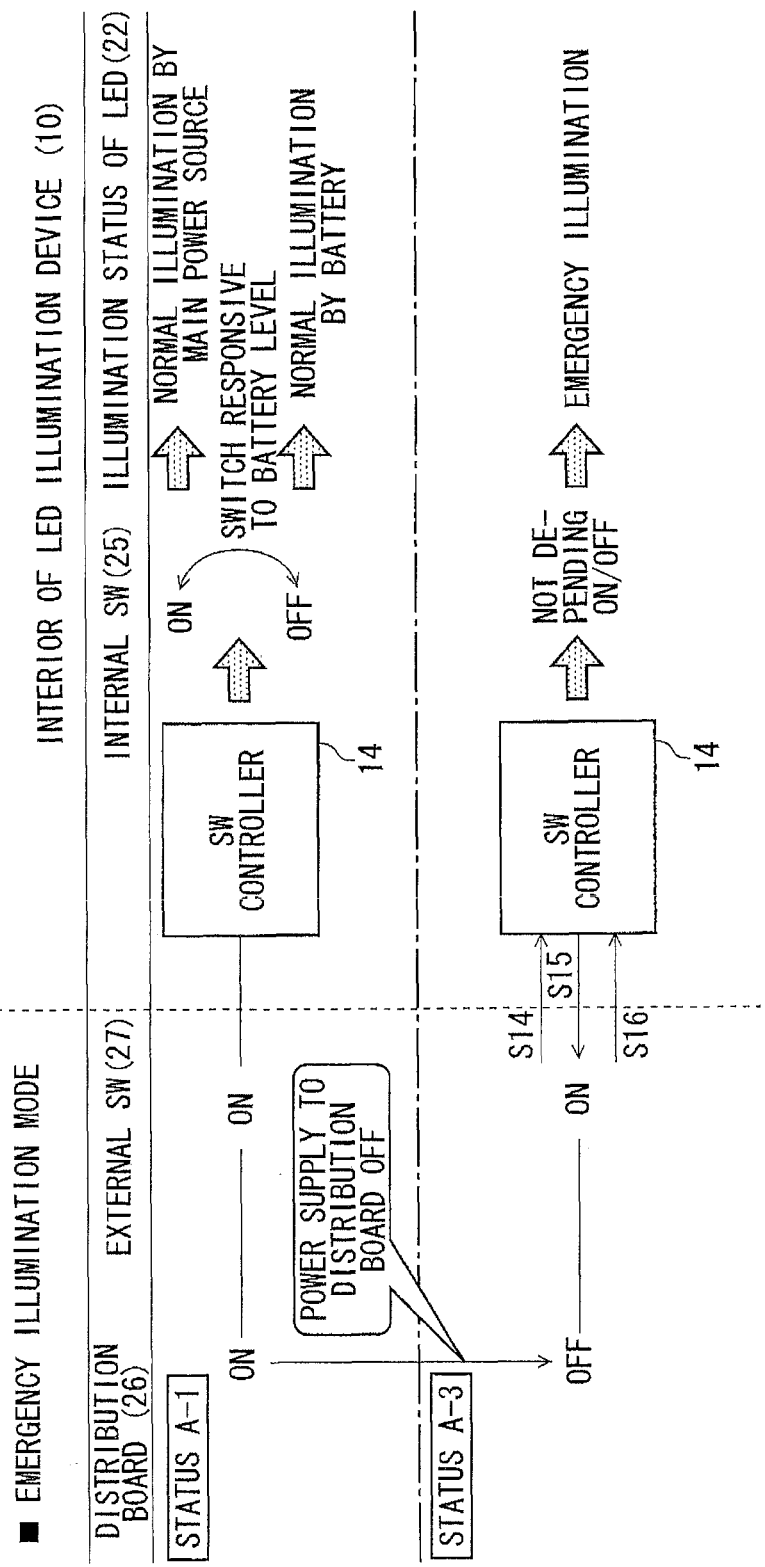
FIG. 6 A chart of the control to be carried out in the emergency illumination mode in this embodiment.

However, for ordinary shops or offices other than public facilities, it would be sufficiently effective in practice to design such that the LED's 22 are lightened as an emergency light, when the illumination device has been normally lightened (in the first normal illumination mode or in the second normal illumination mode) with the external switch 27 being ON but just suddenly been turned off due to a power supply shutdown. Such a system wherein the illumination device functions as a simple emergency light would also be effective, where there is no power line for the emergency lights in a facility having a small floor space or a small number of floors. From these points of view, according to an embodiment of the present invention, the switch controller 14 discriminates a power supply shutdown by flowing a weak electric current into the circuit, so that the illumination device may function as a simple emergency light. The configuration and operation of this embodiment will be described in reference to FIG. 5 and FIG. 6 in addition to FIG. 1 to FIG. 3.

Figure 2:
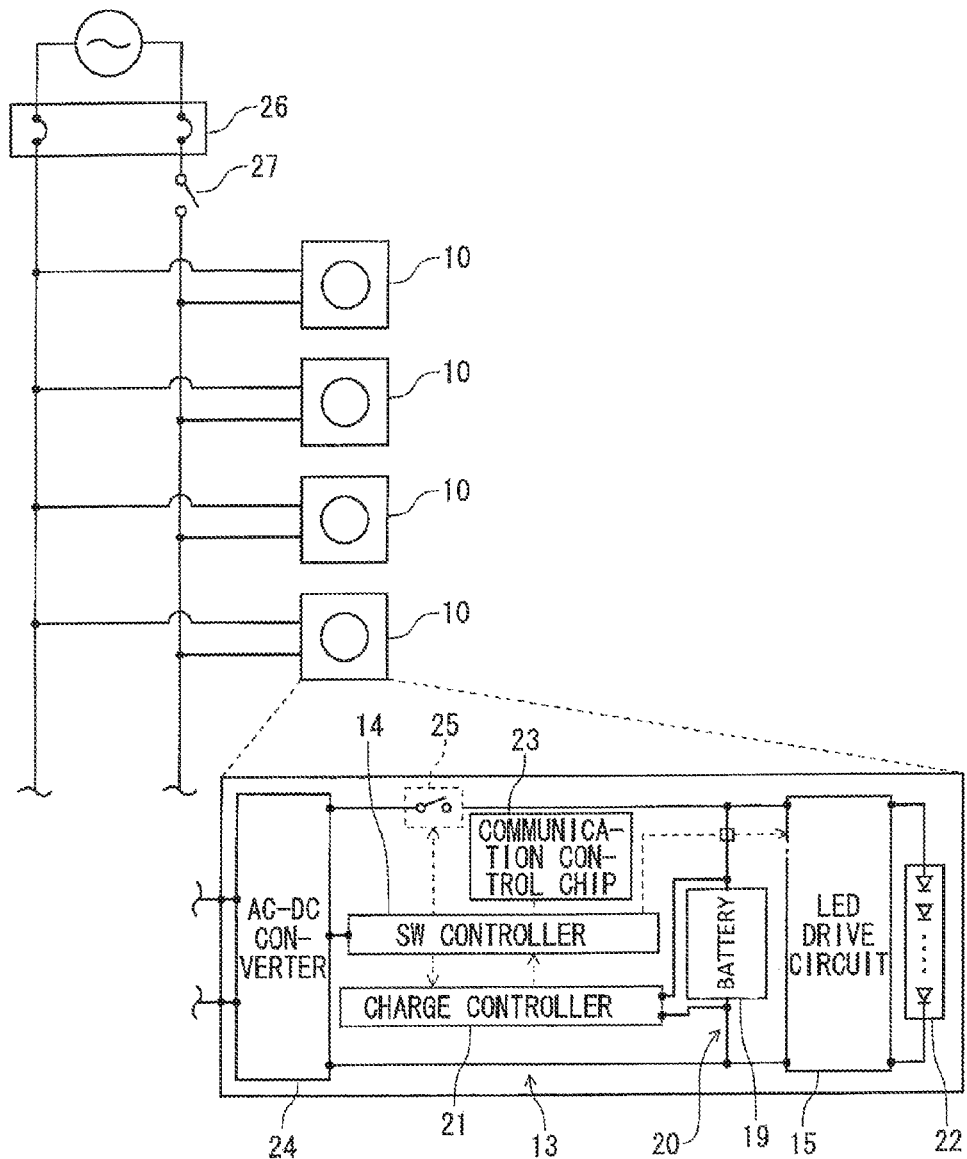
FIG. 2 A block diagram showing a system using this LED illumination device.

Although partly overlapped with the preceding description, let us again explain the control to be executed in the normal illumination ON/OFF operation for switching the LED's 22 by ON/OFF of the external switch 27, in a system wherein a plurality of the LED illumination devices 10 having the construction shown in FIG. 2 are connected to the main power source (AC power). In this case, the distribution board 26 in the facility is ON. The switch controller 14 controls ON/OFF of the internal IC switch 25 based on the residual amount of the battery, while the external switch 27 keeps ON. More particularly, the illumination operation is switched, under the predetermined control conditions, between the first normal illumination mode (FIG. 3:S103, FIG. 4(a)) wherein the LED's are turned on via the first power supply circuit 13 by using DC power (normal power source) obtained by transforming AC power, and the second normal illumination mode 19 (FIG. 3:S105, FIG. 4(b)) wherein the LED's are turned on via the second power supply circuit 20 by using DC power (battery power source) accumulated in the battery 19. See FIG. 5, Status A-1.

When the external switch 27 is turned OFF in this state, the switch controller 14 detects that a power supply to the illumination devices 10 is suddenly interrupted (S11), and then causes a weak electric current to flow into an AC power circuit of the main power source (S12). However, because that the external switch 27 is OFF at this time, the weak current does not come back to the switch controller, by which it is confirmed that there is a circuit breakout (S13). In this case, the switch controller 14 discriminates that the normal light-out operation has been carried out by the external switch 27, and controls such that, regardless of the normal illumination mode of that time (in other words, regardless of whether the device has been in operation either in the first normal illumination mode or in the second normal illumination mode), the LED drive circuit 15 is switched off to turn off the LED's 22 (FIG. 5: Status A-2). The sudden power supply shutdown may be detected by detecting a sudden drop of the voltage, which is continuously monitored by the switch controller 14 (the same is applicable in the following description).

The control to be executed when a power supply shutdown occurs during operation in the normal illumination mode (A-1) will be described in reference to FIG. 5. This control is carried out at S107 and the succeeding steps in the flowchart of FIG. 3. In this case, the switch controller 14 will also detect that a power supply to the illumination device 10 is suddenly interrupted (S14) and, therefore, cause a week electric current to flow into the AC power circuit of the main power source (S15). In this case, though there is no power supply to the distribution board in the facility, the external switch 27 remains ON meaning that the circuit itself keeps alive, so that it confirms at S16 that there is no circuit breakout (wherein the weak current comes back via the circuit). At this time, the switch controller 14 discriminates that a power supply shutdown has occurred, and controls the LED drive circuit 15 to be driven, as far as the external switch 27 remains ON, regardless of whether the internal IC switch 25 is ON or OFF (in other words, whether the illumination device is being lightened either in the first normal illumination mode or in the second normal illumination mode). Regardless of whether the internal IC switch 25 is ON or OFF, the second power supply circuit 20 remains alive as a closed circuit, so that the LED's 22 are lightened by a power from the battery 19 as an emergency light (FIG. 6: Status A-3).

In this embodiment, even if a power supply shutdown occurs while the external switch 27 is OFF (FIG. 5: Status A-2), a sudden power shutdown detection signal (S14) is not inputted to the switch controller 14, because no power has been supplied to the illumination device 10 in this case. Therefore, according to this embodiment, the LED's 22 cannot be lightened as an emergency light, even if a power shutdown should occur while the external switch 27 is OFF.

Figure 7:
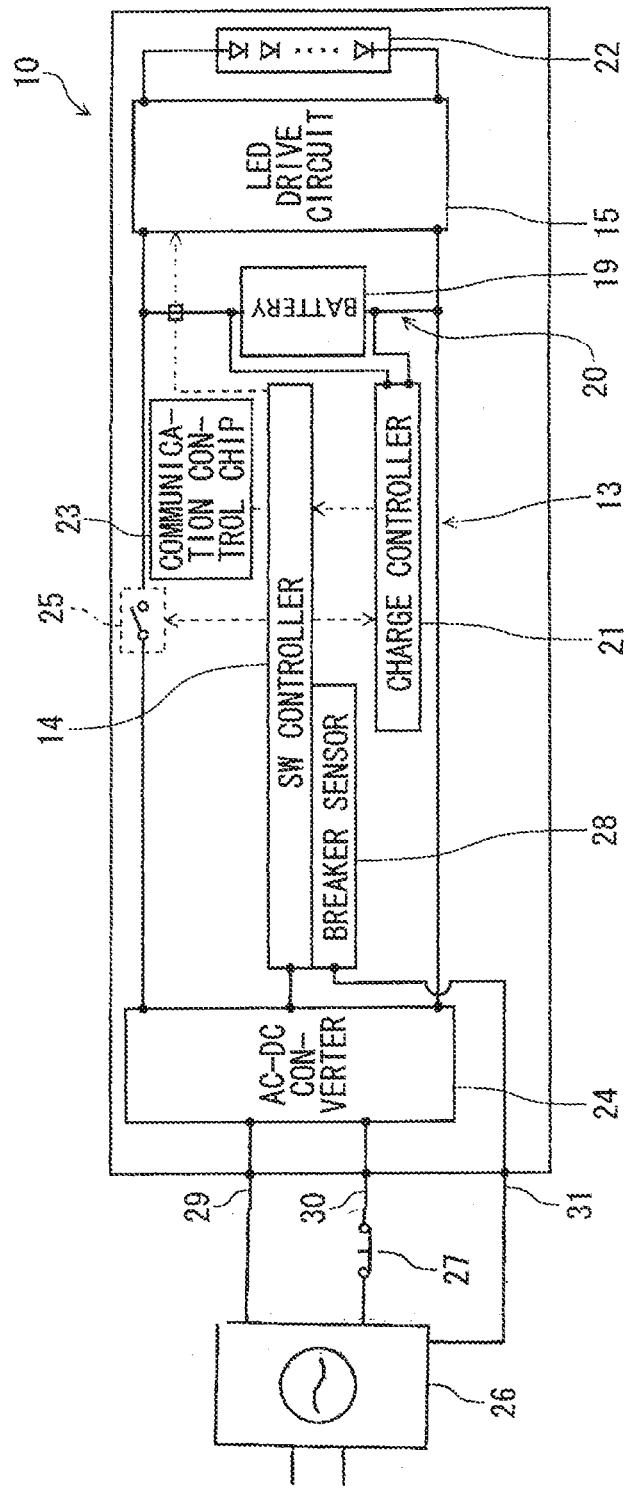
FIG. 7 A control circuit in another embodiment wherein there is a breaker sensor so that the illumination device may be used as a formal emergency light.
Figure 8:
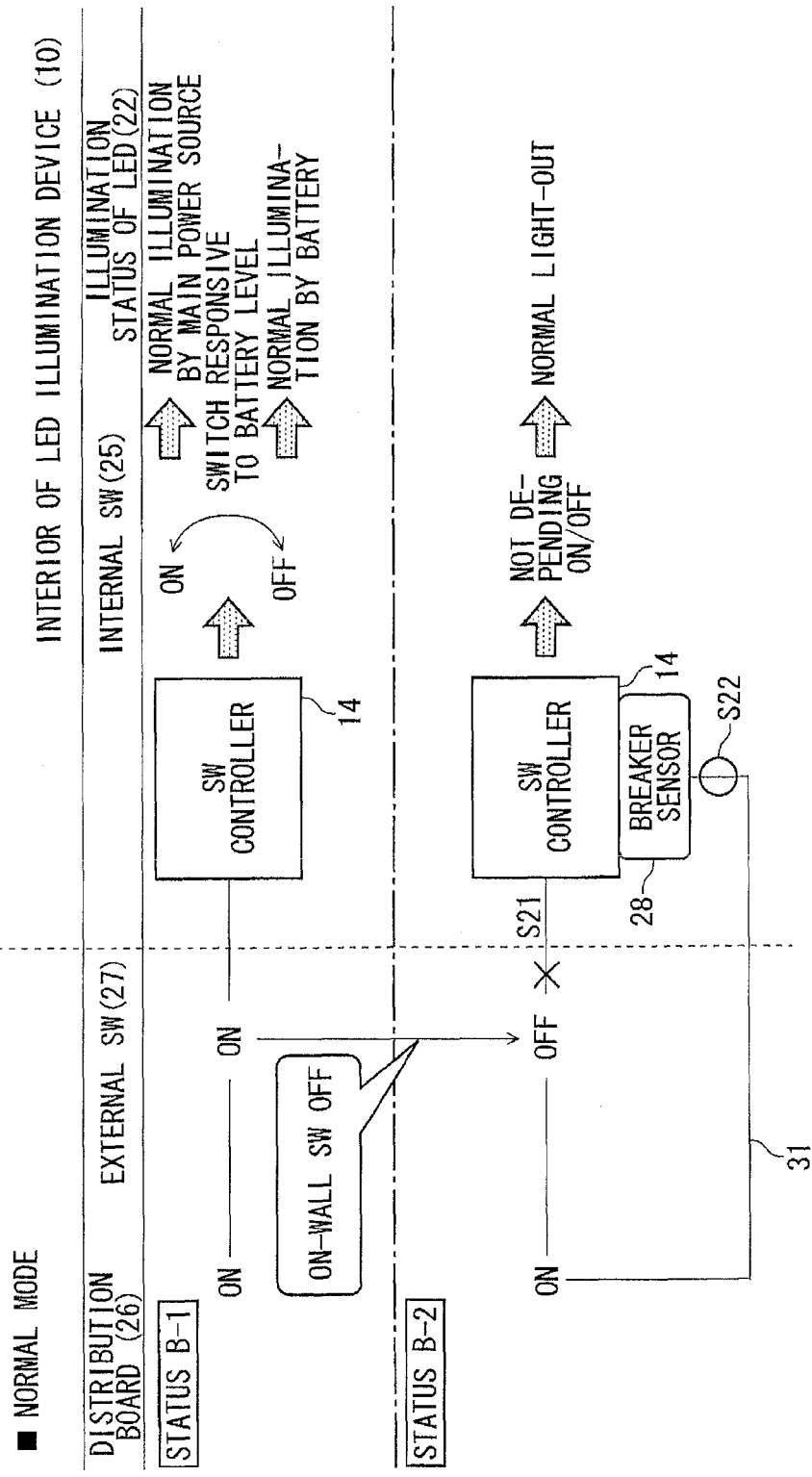
FIG. 8 A chart of the control to be carried out in the normal illumination mode and in normal the light-out mode in this embodiment.
Figure 9:
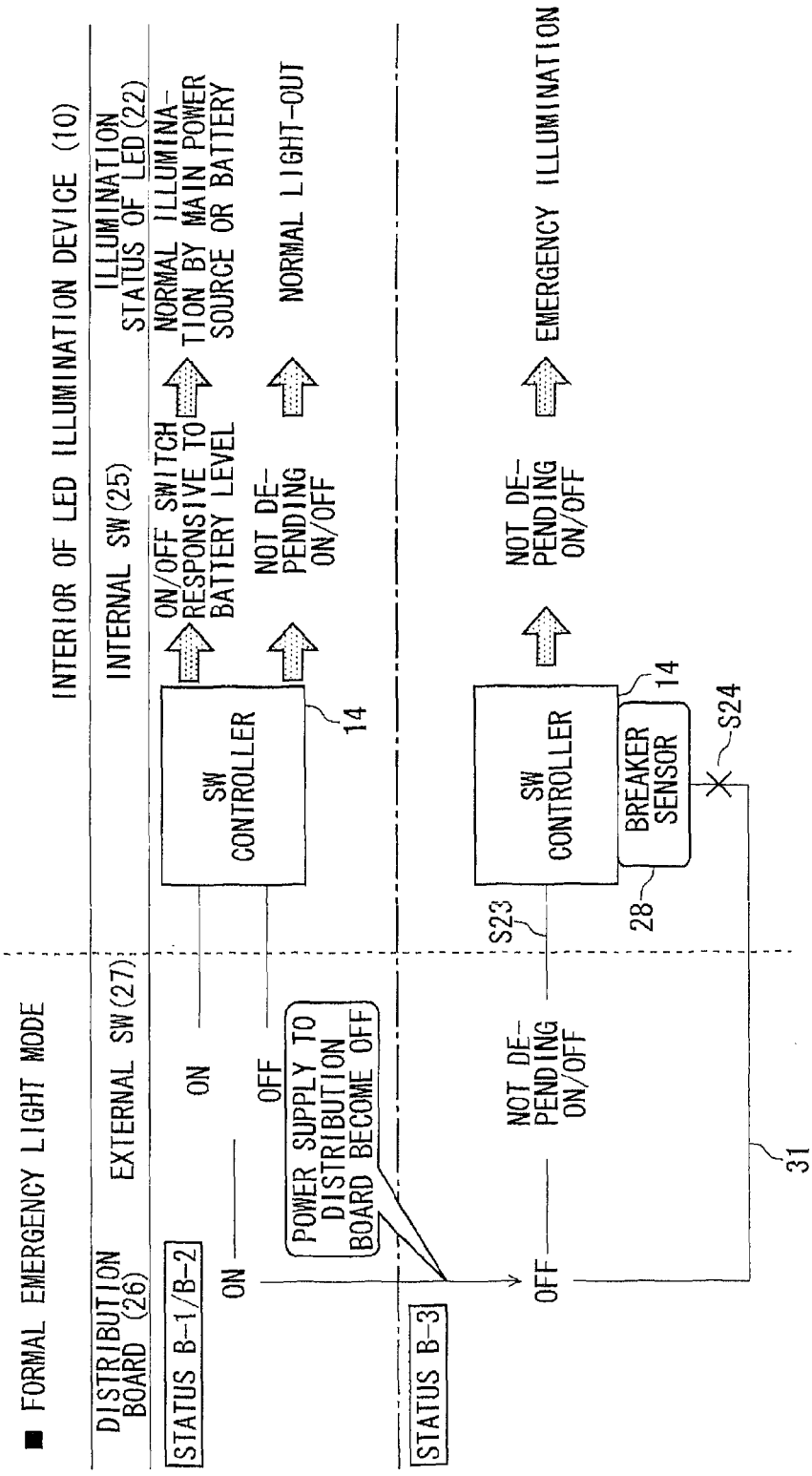
FIG. 9 A chart of the control to be carried out in the emergency illumination mode.

Next, the configuration and operation of another embodiment operable as a formal emergency light will be described in reference to FIG. 7 to FIG. 9. The configuration of the illumination system according to this embodiment (FIG. 7) is substantially the same as the configuration of the illumination system according to the afore-mentioned embodiment (FIG. 2), but includes a breaker sensor 28 for detecting a current flow status of the distribution board 26 in the facility, by detecting whether or not there is a current flow from a third power line 31, which is arranged in addition to the power lines 29, 30 connected to the AC-DC converter 24 in the illumination device 10. A detection signal is inputted to the switch controller.

The control to be executed in this system for the switching of the LED's 22 in response to ON/OFF of the external switch 27 will be described, which is done in the normal illumination ON/OFF mode when a plurality of the LED illumination devices 10 are connected to the main power source (AC power). In this case, the distribution board 26 in the facility is ON. The switch controller 14 controls ON/OFF of the internal IC switch 25 based on the residual amount of the battery, while the external switch 27 keeps ON. More particularly, it will control such that the illumination mode is switched, under the predetermined control conditions, between the first normal illumination mode (FIG. 3:S103, FIG. 4(a)) wherein the LED's are turned on by the normal power source, and the second normal illumination mode (FIG. 3:S105, FIG. 4(b)) wherein the LED's are turned on by the battery power (FIG. 8: Status B-1).

When the external switch 27 becomes OFF in this case, the switch controller 14 detects that a power supply to the illumination devices 10 is suddenly interrupted (S21), and at the same time confirm that a power is normally supplied via the third power line 31 in response to receipt of the signal (S22) from the breaker sensor 28. In this case, the switch controller 14 discriminates that the normal light-out operation has been carried out by the external switch 27, and controls such that, regardless of whether being lightened in the first normal illumination mode or in the second normal illumination mode, the LED drive circuit 15 becomes OFF to switch off the LED's 22 (FIG. 8: Status B-2). The control to be executed at this time will substantially be the same as the control to be executed in the normal illumination ON/OFF mode in the previous embodiment, which has been described in reference to FIG. 5.

The control to be executed when a power supply shutdown occurs during operation in the normal illumination mode (B-1) or in the normal light-out mode (B-2) will be described in reference to FIG. 9. In this case, the switch controller 14 confirms, by receiving the signal (S24) from the breaker sensor 28, that a power supply via the third power line 31 is interrupted, regardless of whether the sudden power shutdown detection signal (S23) is inputted or not (in other words, regardless of ON/OFF of the external switch 27). In this case, the switch controller 14 discriminates that a power supply shutdown has occurred, and controls such that the LED drive circuit 15 is driven to lighten the LED's 22 by a power from the battery 19, which functions as an emergency light (FIG. 9: Status B-3).

In accordance with this embodiment, the breaker sensor 28 detects a power shutdown, even when the current status is the normal illumination status with the external switch being ON (B-1), which will not depend on ON/OFF of the internal IC switch 25, that is, regardless of whether the normal illumination operation is either in the first normal illumination mode or in the second normal illumination mode, and also even when the current status is the normal light-out status with the external switch being OFF (B-2). Therefore, in each statuses, the LED illumination device 10 may be driven by the battery 19 to be lightened as an emergency light.

As described before, during the normal illumination operation, when the residual amount of the battery monitored by the charge controller 21 reaches the predetermined upper or lower threshold, the switching control is executed between the first illumination mode and the second illumination mode. However, the first illumination mode using the normal power source and the second illumination mode using the battery power source should use different power sources for lightening the LED's 22 with different voltage values, so that the an intensity of illumination in the latter mode would be somewhat low in some cases. For this reason, the illumination intensity is suddenly decreased at the time when the illumination mode is switched from the former to the latter, whereas the illumination intensity is suddenly increased at the time when the illumination mode is switched from the latter to the former, which should sometimes give uncomfortable feeling to the nearby people. To avoid this, the illumination intensity is controlled so as to be gradually decreased or increased at the time of switching the illumination mode, which will provide an energy-saving advantage by preventing an excessive power consumption that should be increased during operation in the second normal illumination mode by the battery to thereby elongate the lighting period and, at the same time, provide a comfortableness with no strange feeling due to a change of the illumination intensity.

Figure 10:
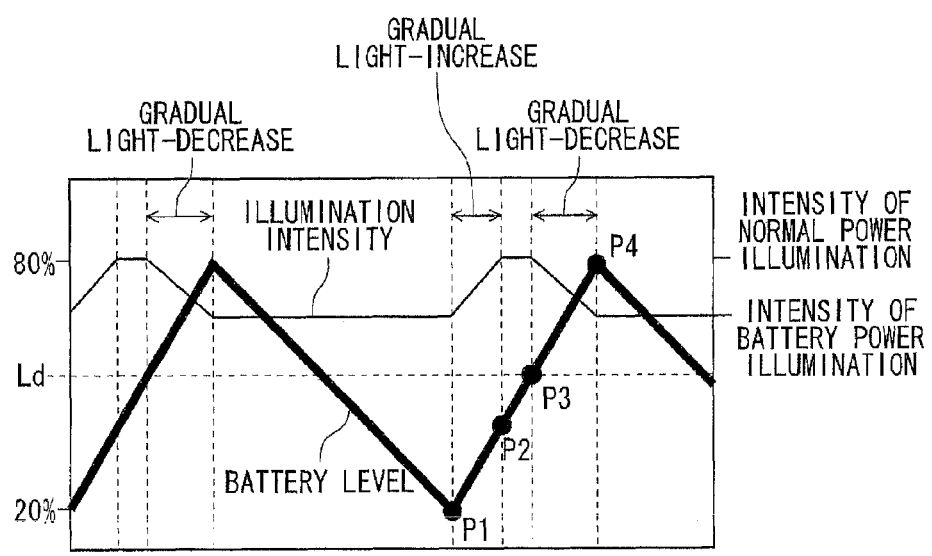
FIG. 10 A graph explaining the gradual light-decreasing and -increasing control to be carried out when an illumination mode using the normal power supply is switched to another illumination mode using the battery power supply, and vice versa.

Referring now to FIG. 10, in an example wherein the switching timing of the illumination mode is set such that the upper threshold is 80% and the lower threshold is 20%, the illumination control is executed in such manner that the illumination intensity for the normal power operation begins to be gradually decreased at the time (P4) when a residual amount of the battery reaches a value Ld (that is 60%, for example) approximate to the upper threshold during operation in the first normal illumination mode by the normal power source (the first power circuit 13), so that the illumination intensity should become substantially equal to an illumination intensity for the battery power operation at the time when the residual amount reaches the upper threshold (80%) so that the illumination mode is just switched to the second normal illumination mode by the battery 19. Further, at the time (P1) when a residual amount of the battery is lowered to the lower threshold (20%) during operation in the second normal illumination mode, the illumination mode is switched to the first normal illumination mode so that the illumination intensity for the battery power operation is controlled to be gradually increased toward the illumination intensity for the normal power operation and finally become substantially equal thereto. More particularly, in FIG. 10, the LED's 22 are lightened in the first normal illumination mode from P1 to P4, during which an illumination intensity is gradually increased from P1 to P2, a constant illumination intensity applicable to the normal power operation remains from P2 to P3, and it is gradually decreased from P3 to P4. The gradual illumination decrease/increase control may be achieved by gradually decreasing or increasing a voltage or current value of the battery 19 within a predetermined period of time. For example, as to a voltage value, it may be decreased or increased by several tenth part (0.1V or 0.2V, for example) in one minute, or as to a current value, it may be decreased or increased by several mA in one minute. The residual amount thresholds at which the gradual decrease/increase should begin (in this embodiment, a gradual illumination decrease begins at 60% and a gradual illumination increase begins at 20%) are stored in the charge controller 21, as ones of the product specifications or values determinable by the user.

The gradual illumination decrease/increase control shown in FIG. 10 is only an example, and any control design may be used as far as it controls such that the illumination intensity is gradually decreased to become substantially equal to that of the battery power illumination by the time when the first normal illumination mode is switched to the second normal illumination mode, and that the illumination intensity begins, when the second normal illumination mode is switched to the first normal illumination mode, to be gradually increased to soon become substantially equal to that of normal power illumination. As to the gradual illumination increase control, as described before, it is preferable that the second normal illumination mode is switched to the first normal illumination mode at the time of the starting the control, so that the gradual illumination increase control should be executed all in the first normal illumination mode, which will minimize the consumption of the battery 19 and simplify the control of the battery 19.

When the LED's 22 are to be lightened as an emergency light by the battery 19 in case of a power supply shutdown (in the emergency illumination mode, Status A-3 in FIG. 6, Status B-3 in FIG. 9), the charge controller 21 may control such that it is lightened with voltage and current values which have been stored in the internal IC switch 25 for the emergency illumination (as ones of the product specifications or values determinable by the user, that may be 30% of that of the normal power illumination, for example), which will prevent the consumption of the battery 19 and maximize the lighting period of the emergency light. The Fire Services Act prescribes that the illumination intensity in the emergency illumination mode should be mounted onto a ceiling to provide at least 2 lux with respect to the respective ceiling height to which the illumination device is mounted. The voltage/current values for lightening the emergency light should preferably be determined to be relatively low as far as they may satisfy the illumination intensity requirement, which will make it possible that the emergency light keeps on for the order of 24 hours at the maximum.

The residual amount of the battery is gradually reducing even during operation in the emergency illumination mode. It is preferable that the emergency illumination should be kept operative, even when the residual amount of the battery becomes lower than the lower threshold, as far as the battery does not fall into an over-discharged condition. Thus, a lower threshold at S109 in FIG. 3 is determined lower than another lower threshold to be used for the switching of the normal illumination mode (S106), thereby keeping the emergency illumination for a longer period of time.

Figure 11:
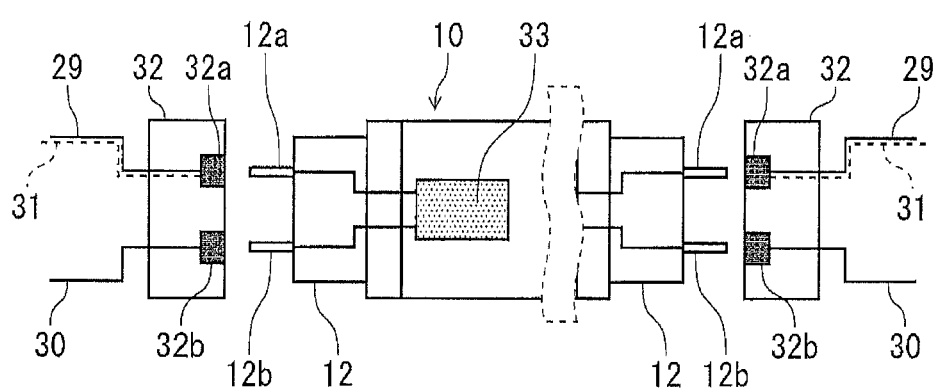
FIG. 11 A view showing a manner of how the LED illumination device is fitted between the sockets in still another embodiment.
Figure 12:
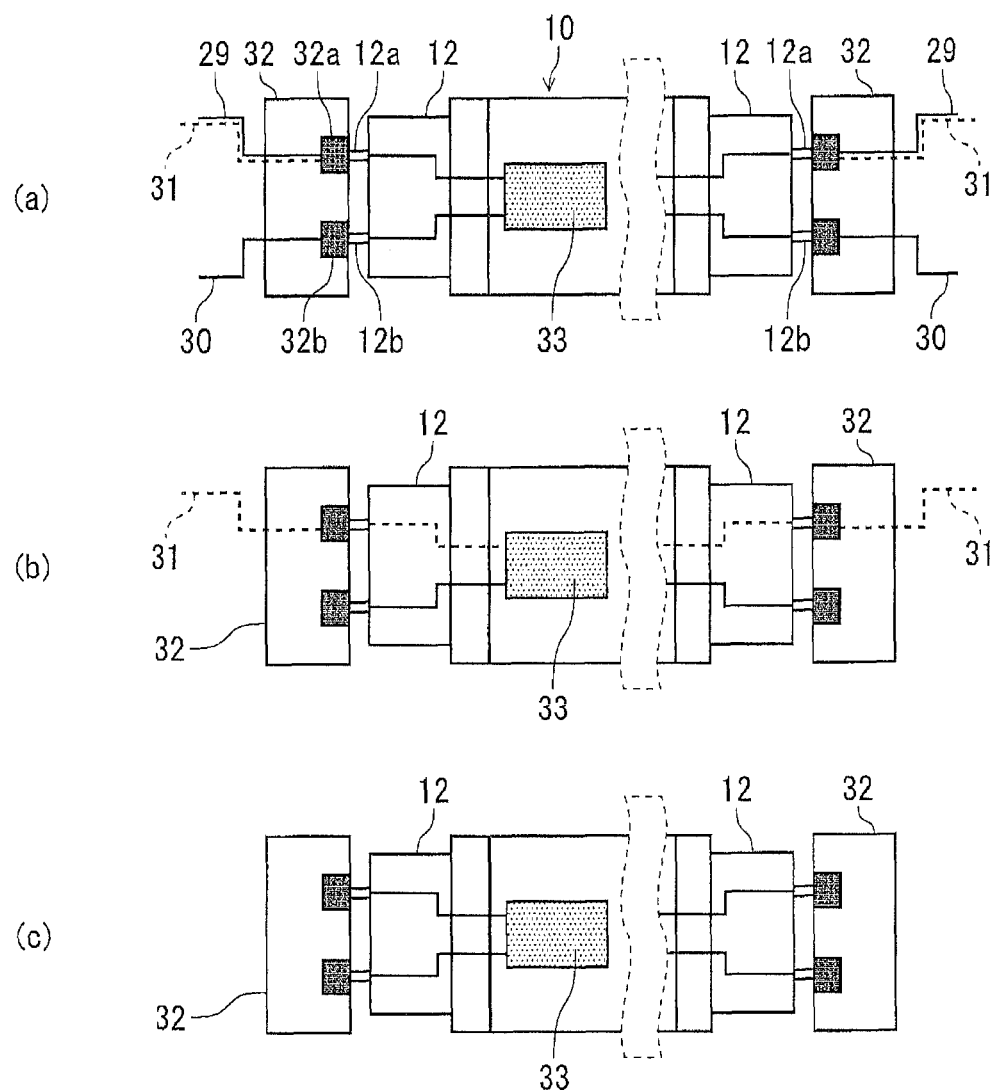
FIG. 12 A view showing the current-flow status in the embodiment of FIG. 11, wherein (a) shows the current-flow status when the LED illumination device operates in the normal illumination mode, (b) shows the current-flow status when it operates in the normal light-out mode, and (c) shows the current-flow status when it operates in the emergency illumination mode.

FIG. 11 and FIG. 12 show another embodiment for discrimination of occurrence of a power supply shutdown (FIG. 3:S107). In this embodiment, as in the embodiment shown in FIG. 7-FIG. 9, in addition to a current supplied via the power lines 29, 30 to the AC-DC converter 24 in the LED illumination device 10 for lightening the LED illumination device 10 in the above-described first normal illumination mode and also for charging the battery 19, another current is supplied via the other power line 31 to either one (a base outlet 32a in FIG. 11 and FIG. 12) of a pair of outlets 32a, 32b arranged in each of the sockets 32, 32 in opposite ends in a longitudinal direction of an apparatus for fitting the fluorescent lamp. Consequently, as far as an AC power from the distribution board 26 in the facility is kept supplied (which means there is no power supply shutdown), when the LED illumination device 10 is fitted between the opposite sockets 32, 32 (that is, when pins 12a, 12b of the respective base portions 12 of the LED illumination device 10 are plugged into the outlets 32a, 32b of the respective sockets 32), the current flows through the power line 31, the outlets 32a and the pin 12a into the LED illumination device 10. In this embodiment, an IC chip 33 mounted in the LED illumination device 10 discriminates whether there is a power supply shutdown, based on the power conduction status of the three power lines 29, 30, 31. This IC chip will constitute "controller" in the present invention, and correspond to the switch controller 14 in the previous embodiments. Other parts and elements in the LED illumination device 10 are not shown in FIG. 11 and FIG. 12. Although the current from the power line 31 is supplied to the one outlet 32a of each of the opposite sockets 32, 32 in the above description, it may be supplied to the both outlets 32a, 32b of each of the opposite sockets 32, 32 and it may also be supplied to one or both of the outlets 32a, 32b of the one socket 32.

When an AC power is supplied from the distribution board 26 in the facility to the respective LED illumination devices 10 while the external switch 27 keeps ON, the three power lines are all powered so that the devices are controlled in the normal illumination mode (FIG. 12(a)). As described before, mainly responsive to the residual amount of the battery, the illumination mode is switched, under the predetermined control conditions, between the first normal illumination mode (FIG. 3:S103, FIG. 4(a)) wherein the LED's are turned on via the first power source circuit 13, and the second normal illumination mode (FIG. 3:S105, FIG. 4(b)) wherein the LED's are turned on via the second power source circuit 20.

When the electricity flows through the AC power lines leading from the distribution board 26 in the facility but the external switch 27 is OFF, which means that only the power line 31 is powered, the device will be controlled in the normal light-out mode (FIG. 12), so that the LED illumination device 10 is turned off (S111) and the battery 19 is charged with the AC power supplied from the power line 31.

When all of the power lines 29, 30, 31 are not powered (FIG. 12(c)), irrespective of ON/OFF of the external switch 27, no electricity flows any one of the AC power lines from the distribution board 26 in the facility. In this case, it is discriminated that there is an emergency power supply shutdown (S107:Yes) and the control is carried out at S108 and the succeeding steps. The LED illumination device 10 will keep lightened as the emergency light by the battery power source, until the remaining charge of the battery 19 becomes below the lower threshold (S109:Yes). In another embodiment, a timer is used to confirm that the device has been lightened as the emergency light for a predetermined period of time (30 minutes, for example). When such is confirmed, the device may be controlled to be automatically turned off, even if the residual amount of the battery remains still above the lower threshold.

In this embodiment, the IC chip 33 detects the power status of the three power lines 29, 30, 31 and, based on the result of such detection, discriminates whether or not a power supply shutdown has occurred. This means that S101 and S107 in the flowchart of FIG. 3 are executed at the same time.

As described above in reference to several embodiments, under the control by the switch controller 14, when the device is turned off even if the normal light-out switch operation is not done, the LED's 22 is caused to be lightened by the battery 19, which makes it possible that it serves as an emergency light. The conventional emergency lights have been installed individually from the normal lighting fixture using the fluorescent lamps, so that only Et limited number of the emergency lights would be lightened in a power supply shutdown area. On the contrary, according to the present invention, all the LED illumination devices 10 connected to the AC power supply circuit in a power supply shutdown area can be lightened as the emergency lights. Therefore, even when a power supply shutdown has occurred due to an earthquake or fire especially in an underground railway or an underground shopping area, everybody in said area can take refuge in safety and at ease, without causing a panic. This illumination system may also be effectively applicable in most of offices, for example.

Figure 13:
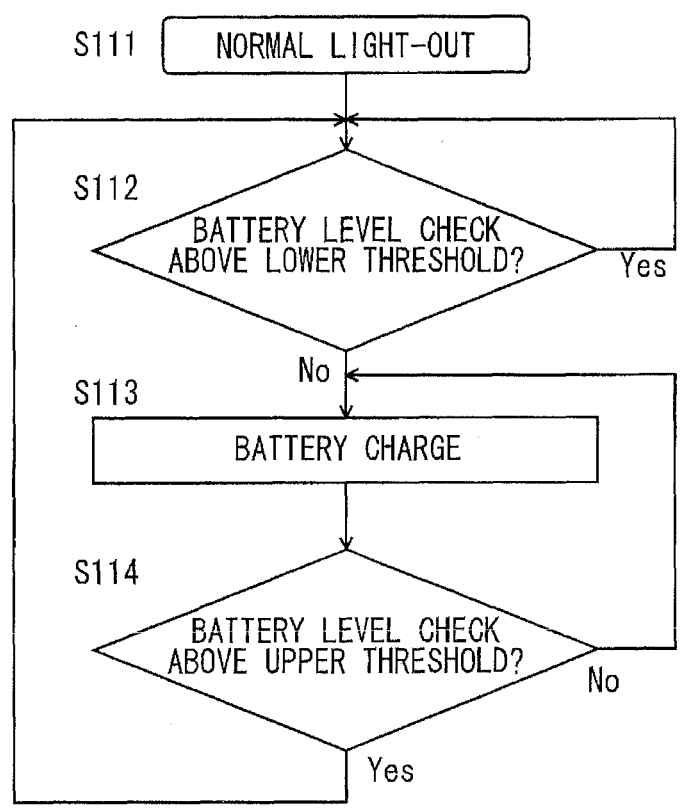
FIG. 13 A flowchart showing the control flow applicable to operation in the normal light-out mode.

FIG. 13 is a flowchart showing a control flow in the normal light-out mode (FIG. 3:S111), which will be executed when the external switch 27 becomes OFF while there is no power supply shutdown in the normal power-off status (S107:No). First, a residual amount of the battery is confirmed at S112. When it is confirmed that it is below a predetermined lower threshold (20%, for example, of a full-charged voltage) (S112:No), the battery 19 is charged with AC power supplied from the AC power line 31 (S113). This will increase the residual amount of the battery, and when it reaches a predetermined upper threshold (90%, for example, of the full-charged voltage) (S114:Yes), the control operation is returned to S112, and the battery begins to be re-charged (S113) when it is lowered to below the lower threshold (S112:Yes).

In such an embodiment wherein the battery 19 is charged with the AC power while the external switch 27 is OFF, it is preferable that the battery is charged in a time zone, such as a night time zone, to which a reduced electric utility rate is applicable, to thereby achieve a cost-saving advantage. For example, Tokyo Electric Power Co., Ltd. offers a reduced electric utility rate during a night time zone of 10 PM to 8 AM. Therefore, the maximum cost-saving effect may be achieved, when the battery charge is carried out in this night time zone and the LED illumination device 10 is lightened (in the second normal illumination mode) other than in the night time zone (in the daytime) by using the battery 19 that has been substantially fully charged.

Figure 14:
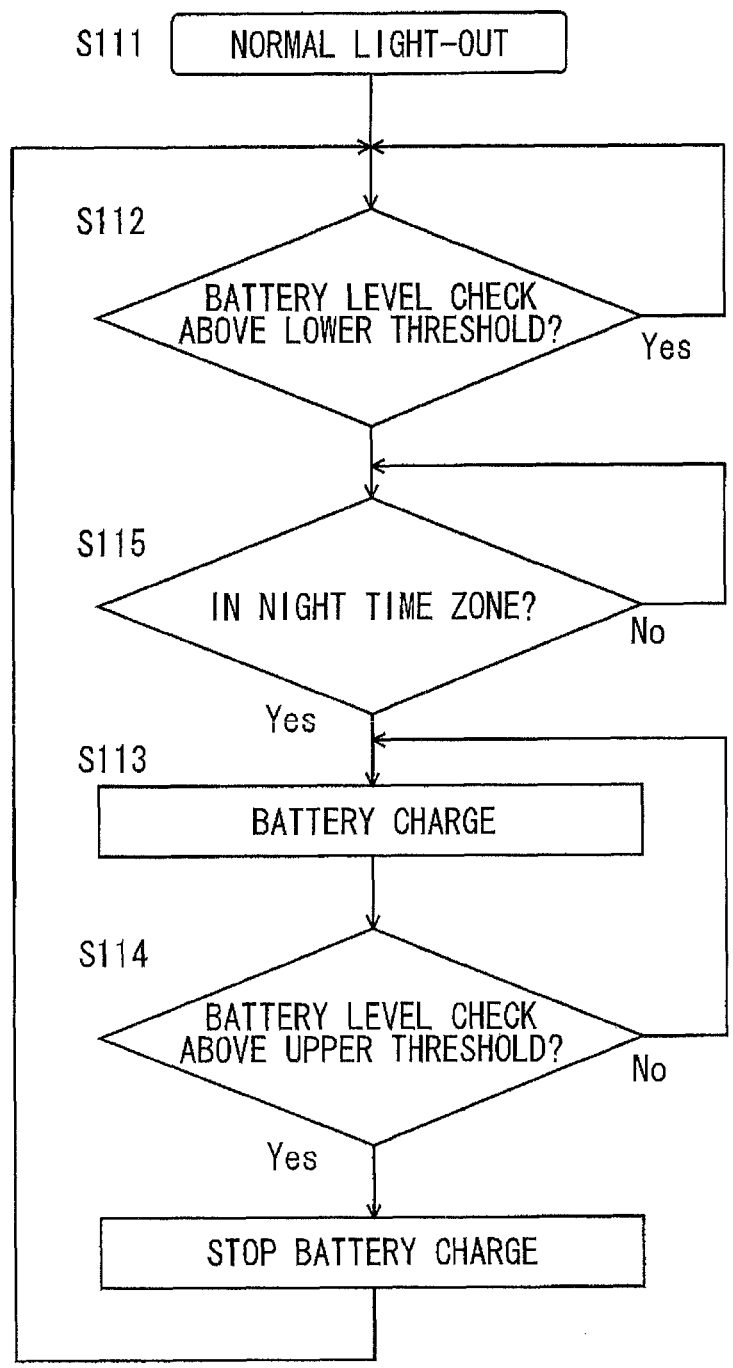
FIG. 14 A flowchart showing the control flow applicable to operation in the normal light-out mode in another embodiment wherein the battery is charged during the night time zone.

In accordance with the illustrative embodiment shown in FIG. 11 and FIG. 12, the battery 19 may be charged by using the AC power line 31, not only when the external switch 27 is ON but also when the external switch 27 is OFF. By making use of a clock feature of the IC chip 33, the battery 19 may be charged by using the night time power. At this time, only the power line 31 is in the powered status (FIG. 12(b)), which is detected to thereby start the control in the normal light-out mode (S11). The control flow to be executed at this time is shown in FIG. 14. This control flow is similar to the control flow shown in FIG. 4-13, but includes the step S115 to be carried out when the operation in the normal light-out mode (S111) starts, to thereby discriminate whether the current time is in the night time zone or not. When it is discriminated at S115 that the current time is in the night time zone (S115:Yes), the control proceeds to the battery check at S112 for controlling the battery charge. When the current time is not in the night time zone (S115:No), it watches and waits until it enters the night time zone.

The above-described manner of control is only an example, and any control manner may be used, as far as it controls such that, in a case where first and second time zones are determined, a higher electric utility rate being applied to the first time zone (daytime, for example) and a lower electric utility rate being applied to the second time zone (night time, for example), the battery 19 is charged in the night time zone and the battery 19 has been fully charged before the daytime zone begins. For example, a power for charging the battery is regulated based on a residual amount of the battery that could be confirmed by a current or voltage value and a period of time remaining until the daytime zone begins, so that the battery may become fully charged immediately before the night time zone should expire. In an example, the battery charging operation begins at 6 AM and the battery charging power is regulated based on a current value and/or a voltage value of the battery 19 so that the battery 19 becomes fully charged immediately before expiration of the night time zone, which provide the most effective battery charge control. The setup time may optionally be changed in conformity to the contents of a contact with a power company having the jurisdiction for the facility in which the LED illumination devices 10 are installed.

The LED illumination device 10 includes a built-in communication control chip 23 (see FIG. 1, FIG. 2). The communication control chip 23 stores an IP address peculiar to each LED illumination device 10. When an administrative server (not shown) connected for interactive data communication with the device via a network such as the Internet receives data from specific LED illumination device(s) 10 via the communication control chip 23 mounted therein, it refers to its peculiar IP address to identify the LED illumination device 10 from which the data was transmitted. It is also possible that the administrative server transmits the control data to specific LED illumination device(s) 10. Therefore, the administrative server may change the control parameters (for example, set values used for various control) at the same time with respect to all the LED illumination devices 10 that are subjected to the control by the same administrative server, or change the control parameters at the same time with respect to only one or more of specific LED illumination devices 10, or alternatively change the control parameters separately and individually for each of the respective LED illumination devices 10. Such control may be achieved based on the peculiar IP address assigned to each LED illumination device 10.

More specifically, in an example, the LED illumination devices 10 may be administrated by remote control for every location of the illumination devices in a shop. Japan extends both in a north-south direction and in an east-west direction, so that different places have different sunrise/sunset times and daylight hours, which means that a luminous energy necessary for a shop may be different at different areas and/or time zones. In addition, the luminous energy necessary for the shop will change variously and every hour, depending upon installation environments of the illustration devices, orientation of doors and openings, seasons, weather conditions, and so on. The control by the control program stored in the respective LED illumination devices 10 could not respond to such real-time changes in most cases, which results in non-negligible wastes for an administrator having a number of chain stores in various locations all over the country. To cope with this, to each LED illumination device 10 is assigned an individual ID that uniquely specifies various data peculiar to the said illumination device, including location data (latitude and amplitude) of the shop, daylight data at the said location, orientation of the openings, location of installation of the illustration device, season, daily weather forecast data, etc. By this, it becomes possible that the administrative server may control, all at once, the plural LED illumination devices 10 in the respective installation locations in each store, which will not rely upon the control program stored in each LED illumination device 10. The information or data stored in the individual ID for each LED illumination device 10 may be changed at any time by remote control from the administrative server.

In the meantime, when an event such as a sudden weather change or an emergency works in a neighbor building should happen locally, which could not have been imagined at the original setup, the administrative server is difficult to recognize such event accurately, in which case, it is not always preferred that the illumination device are controlled with the setup programmed by the administrative server. To cope with this, the order of priority is preset to the communication control chip 23 to thereby determine which should be applicable in a specific condition, a signal from the administrative server or data in the LED illumination device 10 itself. This will make it possible to control the illumination with good responsibility to any sudden condition changes.

The system configurations described before are only an example of application of the present invention. The LED illumination device 10 to which the peculiar IP address and ID have been assigned is connected to the administrative server via the Internet, for example, to allow interactive data communication therebetween. Therefore, by transmitting the control signal from the administrative server to specific or optional LED illumination devices 10, these LED illumination devices 10 may be lightened individually or altogether. Likewise, any instruments mounted in or associated with the LED illumination devices 10 may be activated by the remote control. When receiving data from an LED illumination device 10, the administrative server may at once recognize the source LED illumination device 10, which may be effectively utilized for automatic maintenance and inspection, crime prevention, for example.

Figure 15:
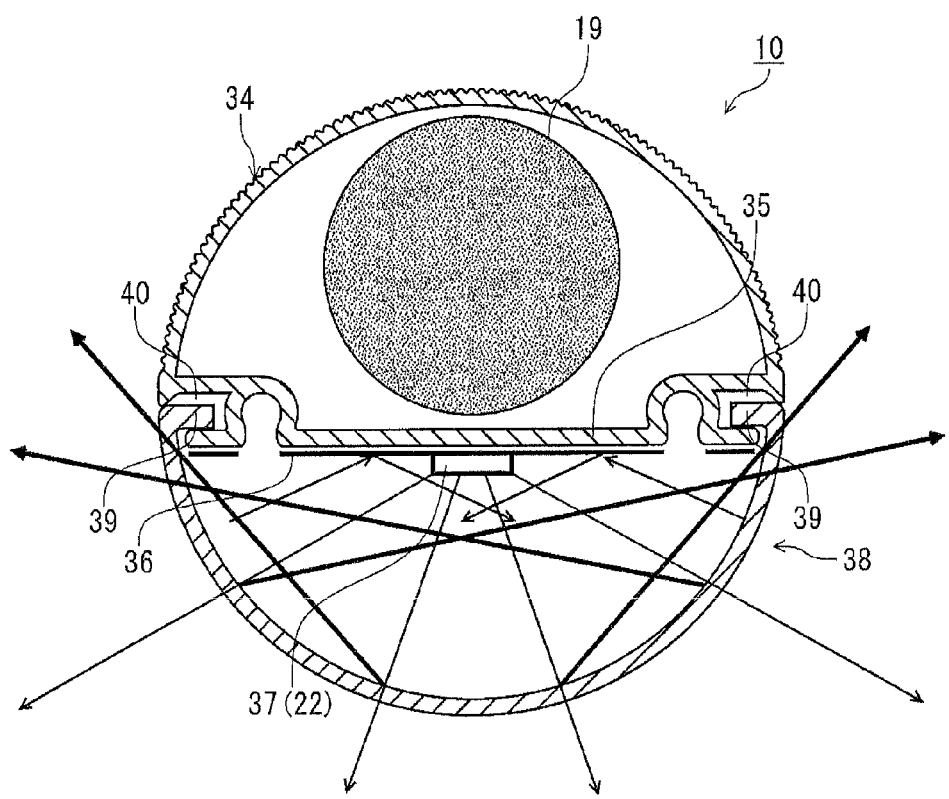
FIG. 15 A schematic cross-sectional view showing an example of the cover and the interior of a fluorescent lamp type LED illumination device according to the present invention.

FIG. 15 is a schematic cross-section showing a preferred example of the cover and the interior of the fluorescent lamp type LED illumination device 10 according to the present invention. In accordance with this embodiment, a power source unit including the first power source circuit 13, the battery 19 and the second power source circuit 20 is contained in a space in an aluminum heat sink 34 of substantially a semi-circular cross-section, and a substrate 37 mounting a number of LED's 22 thereon is secured to a flat base 35 of the heat sink 34, via a high-reflective sheet 36. An LED cover 38 made from a semi-transparent polycarbonate is formed into substantially a semi-circular cross-section. Engagement pieces 39, 39 at the opposite ends are engaged with the engagement members 40, 40 at the opposite ends of the heat sink 34 to form a fluorescent lamp of a perfect circle in cross-section.

The average outer diameter of the existing fluorescent lamp is 32.5 mm, so that it is preferable that the LED illumination device 10 of the present invention has an outer diameter not exceeding 32.5 mm in order to be mountable to the installation device already existing for the fluorescent lamp. However, a high-capacity lithium ion battery that can be preferably used as the battery 19 is about 15 mm in diameter for the smallest one among those available at present. When the overall configuration is divided into the heat sink 34 and the LED cover 38 each formed into a semi-circular (180 degrees) in cross-section, in some case, the heat sink cannot provide a sufficient space for containing the battery 19. On the other hand, when the heat sink 34 is formed to have a cross-section larger than a semi-circle, the LED cover 38 should become smaller, which would make it difficult to diffuse the illumination of the LED's 22 in a wide angle. From these points of view, in the preferable cover configuration shown in FIG. 15, while the heat sink 34 and the LED cover 38 are connected to each other at the semi-circular position of the outer periphery, the flat base 35 of the heat sink 34 is positioned offset toward the LED cover 38 so as to enlarge the space for the battery 19. The LED cover 38 covers a semi-circular area at the outer periphery so that, in addition to reflection from the high-reflective sheet 36, it is possible that the light emitting from the LED's 22 is effectively diffused and reflected in a wide range of 270 degrees, at the maximum. In an external appearance, both the heat sink 34 and the LED cover 38 may look like to have a semi-cylindrical shape, which provides no strange feeling.

LEGENDS

10 Fluorescent lamp type LED illumination device
11 Cover
12 Base
12a, 12b Base pin
13 First power source circuit
14 Switch controller (Controller)
15 LED drive circuit
16 Rectifier
17 Voltage transformer
18 Electrolytic capacitor
19 Battery
20 Second power source circuit
21 Charge controller (Controller)
22 LED
23 Communication control chip
24 AC-DC converter
25 Internal IC switch (Controller)
26 Distribution board in facility
27 External switch
28 Breaker sensor
29, 30 AC power line for normal illumination
31 AC power line for emergency illumination and battery charge
32 Socket
32a, 32b Base outlet
33 IC chip (Discriminator and Controller)
34 Heat sink
35 Flat base
36 High-reflective sheet
37 LED mount base
38 LED cover
39 Engagement piece
40 Engagement member

The invention claimed is:

1. An LED illumination device fittable between a pair of sockets already provided for a fluorescent lamp, comprising:
   (i) a first power supply circuit that illuminates LED's by using a DC power obtained by converting and rectifying an AC power supplied from the sockets,
   (ii) a second power supply circuit that illuminates the LED's by using an internal battery, and
   (iii) a controller that controls switching of illumination modes during normal illumination operation to be done while a light switch is being ON, the illumination mode being switched between a first illumination mode wherein said first power supply circuit lightens the LED's at a first predetermined intensity of illumination and charges the battery and a second illumination mode wherein said second power supply circuit lightens the LED's at a second predetermined intensity of illumination that is lower than said first predetermined intensity of illumination,
   (iv) said controller further operating to control such that, in an emergency wherein the AC power supply is interrupted, said second power supply circuit lightens the LED's,
   (v) said controller controlling switching of said first and second illumination modes such that said first illumination mode is switched to said second illumination mode in response to detection of a residual amount of the internal battery reaching a predetermined upper threshold, wherein said second illumination mode is switched to said first illumination mode in response to detection of the residual amount of the internal battery reaching a predetermined lower threshold;
   (vi) said controller executing a light-decreasing control when the residual amount of the internal battery increases to a level approximate to said upper threshold during operation in said first illumination mode, wherein an intensity of illumination of the LED's is gradually decreased from said first predetermined intensity of illumination to be substantially equal to said second predetermined intensity of illumination;
   (vii) said controller further executing a light-increasing control when the second illumination mode is switched to said first illumination mode, wherein an intensity of illumination of the LED's is gradually increased from said second predetermined intensity of illumination to be substantially equal to said first predetermined intensity of illumination.

2. The LED illumination device according to claim 1, further comprising a charge controller that constantly monitors the internal battery residual amount, said switch controller judging that the internal battery residual amount reaches to the upper or lower threshold in response to a signal from the charge controller.

3. The LED illumination device according to claim 1, wherein said charge controller executes the gradual light-decreasing control or the gradual light-increasing control by increasing or decreasing a voltage or current value of the battery within a predetermined time period.

4. An LED illumination device fittable between a pair of sockets already provided for a fluorescent lamp, comprising:
   (i) a first power supply circuit for lightening LED's with a DC power obtained by converting and rectifying an AC power supplied from the sockets,
   (ii) a second power supply circuit for lightening the LED's by an internal battery,
   (iii) a controller for controlling light-on and light-off of the LED's in response to detection of an AC power supply from a distribution board through AC power input lines, detection of an ON/OFF status of a switch connected to one of said AC power input lines and detection of a residual amount of the battery to discriminate which mode is applicable, among a first normal illumination mode wherein the LED's are driven by the first power supply circuit, a second normal illumination mode wherein the LED's are driven by the second power supply circuit, a normal light-out mode wherein there is no LED illumination and an emergency illumination mode wherein the LED's are driven by the second power supply circuit so that the LED illumination device functions as an emergency light in case of an AC power supply shutdown;
   (iv) said controller discriminating such that (a) the device is operated in one of said first and second normal illumination modes which is selected by a result of detection of the residual amount of the battery, when detecting that the AC power is supplied and said switch is being ON, (b) the device is operated in said normal light-out mode when detecting that the AC power is supplied but said switch is being OFF, and (c) the device is operated in said emergency illumination mode when detecting that no AC power is supplied, irrespective of said switch is being ON or OFF;

(v) said detection of the AC power supply being discriminated by obtaining information of an AC power supply through at least one emergency detection line connected directly to the distribution board, said emergency detection line being provided separately from said AC power input lines.

\* \* \* \* \*